United States Patent [19]
Vaida

[11] 3,871,109
[45] Mar. 18, 1975

[54] LEVEL VIAL

[76] Inventor: Peter P. Vaida, 17 Fairview Ave., Clinton, N.J. 08809

[22] Filed: Mar. 12, 1973

[21] Appl. No.: 340,522

[52] U.S. Cl. ................................................. 33/379
[51] Int. Cl. ............................................ G01c 9/34
[58] Field of Search ........................... 33/370–373, 33/379, 381, 382, 383, 369

[56] References Cited
UNITED STATES PATENTS

| | | | |
|---|---|---|---|
| 2,752,693 | 7/1956 | Wullschleger | 33/379 |
| 3,583,073 | 6/1971 | Balint | 33/379 |

FOREIGN PATENTS OR APPLICATIONS

| | | | |
|---|---|---|---|
| 15,133 | 12/1885 | United Kingdom | 33/376 |

Primary Examiner—Richard E. Aegerter
Assistant Examiner—Charles E. Phillips
Attorney, Agent, or Firm—Bain, Gilfillan & Rhodes

[57] ABSTRACT

A spirit level vial wherein the bubble containing chamber structure includes an insert means rigidly mounted within a generally cylindrical transparent outer body. The disclosed embodiment provides for reference markings which are protected from scratching and wear. Further, the disclosed vial may be manufactured without resort either to exotic machining methods or to molding methods which have previously resulted in undesirable deformation of the outer body.

19 Claims, 6 Drawing Figures

PATENTED MAR 18 1975 3,871,109

LEVEL VIAL

BACKGROUND OF THE INVENTION

This invention relates to the field of spirit levels and in particular to the field of vials for use in such spirit levels.

Vials for spirit levels traditionally have comprised curved cylinders of transparent material wherein an air bubble is provided to seek an uppermost position. The difficulties attendant to mounting curved vials in spirit levels were recognized, see e.g. U.S. Pat. No. 3,311,990, and it was suggested that spirit level vials be fabricated from tubular plastic sections and thereafter joined together. This approach was unsatisfactory because it proved difficult to join molded vial halves economically. Thereafter, it was attempted to manufacture spirit level vials using tubular extrusions. This approach proved satisfactory in terms of its product however the cost of manufacturing such vials has been excessive.

In an attempt to avoid the expense of machining it was proposed to injection mold a vial around a plunger, see e.g. U.S. Pat. No. 3,593,428. Subsequent to the completion of the molding operation the plunger is removed, the bubble defining expanded section being drawn through the inner bore of the vial cylinder. Although the intended operation of this process is not to exceed the elastic limit of the vial material such has not been the experience of those interested in this art.

SUMMARY OF THE INVENTION

It is an object of the present invention, therefore, to provide a spirit level vial which has a concentric outer surface and which may be manufactured by the use of conventional inexpensive manufacturing techniques.

It is a further object of the present invention to provide a spirit level vial which is suitable for mounting in conventional vial mounting devices and which incorporates a protected reference means.

These and other objects not enumerated are achieved by the spirit level vial according to the present invention one embodiment of which may include a generally cylindrical transparent outer body having a longitudinally extending bore therein, an insert means rigidly received within the bore, the insert means including a cylindrical outer surface and a curved inner surface, the outer surface being substantially equal in diameter to the longitudinally extending bore within the outer body, and reference means for permitting a determination of the position of the longitudinal axis of the spirit level vial with respect to the horizontal.

BRIEF DESCRIPTION OF THE DRAWINGS

A more complete understanding of the present invention may be had from the following detailed description thereof particularly when read in the light of the accompanying drawings wherein.

DETAILED DESCRIPTION

Figure 1:
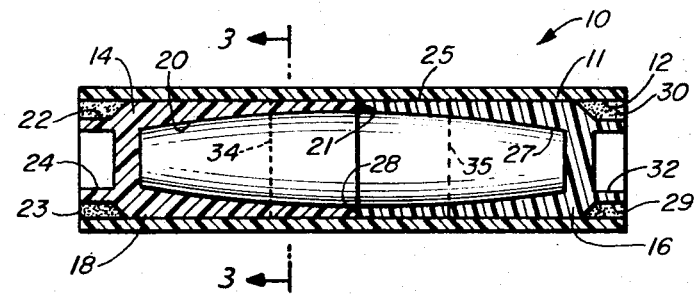
FIG. 1 is a cross-sectional elevational view of one embodiment of spirit level vial according to the invention.

The present invention relates to spirit level vials. One embodiment of such a spirit level vial is shown in FIGS. 1 and 3 and designated generally by the reference numeral 10.

Spirit level vial 10 comprises a generally cylindrical transparent outer body 11 which may be manufactured from any of many known materials suitable for these purposes such as cellulose acetate butyrate. Outer body 11 is provided with a longitudinally axial bore 12 extending therethrough.

Disposed within bore 12 of outer body 11 are a first insert member 14 and a second insert member 16. The first and second insert members may be manufactured of any suitable material such as the material used for manufacture in outer body 11. Further, the first and second insert members 14, 16 are identical in structure.

Figure 3:
FIG. 3 is a cross-sectional view through the plane 3—3 of FIG. 1.

Considering therefore first insert member 14, it can be seen in FIGS. 1 and 3 that first insert member 14 is a generally cylindrical member having an outer axially concentric cylindrical surface 18. The major portion of the center of first insert member 14 is provided with a curved bore 20, the surface of which may define a suitable inner curved surface or bubble chamber for spirit levels, e.g. a barrel configuration, i.e. the general configuration of the middle frustum of a prolate spheroid. The open end of curved bore 20 cooperates with the outer surface 18 of first insert member 14 to define a radially extending inner edge 21.

The outer surface 18 of first insert member 14 is relieved adjacent its closed end to define an annular channel 22 which is provided to accommodate the insertion of a sealing means 23 which may be of an epoxy resin or other materials which are generally known in the art. Additionally, the end surface of first insert member 14 is relieved to define an opening 24 for accommodating a vial support means if such a mounting procedure is desired.

As was noted above, second insert member 16 is identical in structure to first insert member 14 and thus comprises a generally cylindrical member having an outer axially concentric cylindrical surface 25. The major portion of the center of second insert member 16 is provided with a curved bore 27 which is identical in shape to the curved bore 20 of first insert member 14. The open end of curved bore 27 cooperates with the outer surface 25 of second insert member 16 to define a radially extending inner edge 28. As best may be seen in FIG. 1, when the level vial 10 is assembled inner edge 21 of first insert member 14 is in surface to surface engagement with inner edge 28 of second insert member 16.

The outer surface 25 of second insert member 16 is relieved adjacent its closed end to define an annular channel 29 which is provided to accommodate the insertion of a sealing means 30 which will be of the same material as sealing means 23 noted above. Additionally, the inner surface of second insert member 16 is relieved to define an opening 32 for accommodating a vial supporting means.

The outer surfaces 18 and 25 of first and second insert members 14, 16 are provided with marking rings 34, 35 respectively. These rings may be provided in grooves formed in the surface of the respective insert members or they may be provided in any of the many ways known in the art for providing such rings.

Figure 2:
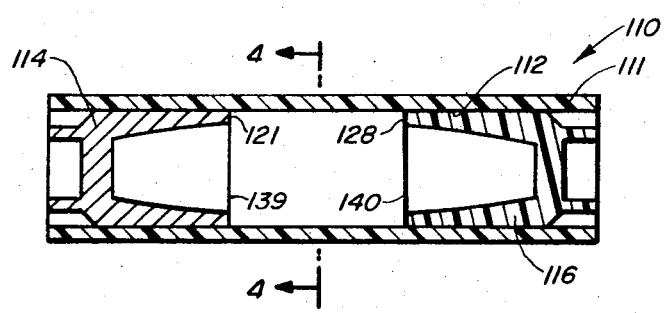
FIG. 2 is a cross-sectional elevational view of a second embodiment of spirit level vial according to the invention.
Figure 4:
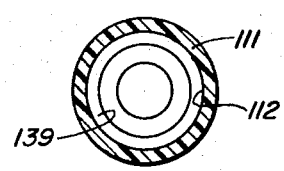
FIG. 4 is a cross-sectional view through the plane 4—4 of FIG. 2.

Referring now to FIGS. 2 and 4 there is shown a second embodiment of a spirit level vial according to the principles of the present invention, which vial is designated generally by the reference numeral 110. As is evident from FIG. 2 the structure of vial 110 is identical to the structure of vial 10 of FIGS. 1 and 3 with the exception of the degree of extension of the insert members within outer body 11.

More specifically, spirit level vial 110 includes a generally cylindrical transparent outer body 111 having an inner cylindrical surface 112.

Rigidly disposed in the opposed ends of outer body 111 are a first insert member 114 and a second insert member 116. Insert members 114 and 116 are identical in all respects to insert members 14 and 16 of spirit level vial 10 except that each is shorter and thus when assembled the inner edges 121, 128 of vial 110 are longitudinally spaced apart.

Rigidly secured to the respective inner edges 121, 128 are circular rings 139 and 140, respectively. The circular rings may be made of any suitable material so long as the material is non-transparent. The function of these circular rings is to define reference marking lines similar to the lines 34, 35 of vial 10 of FIGS. 1 and 3. In all other respects, the vial 110 is identical in structure to vial 10 and thus further detailed description is not deemed necessary.

Figure 5:
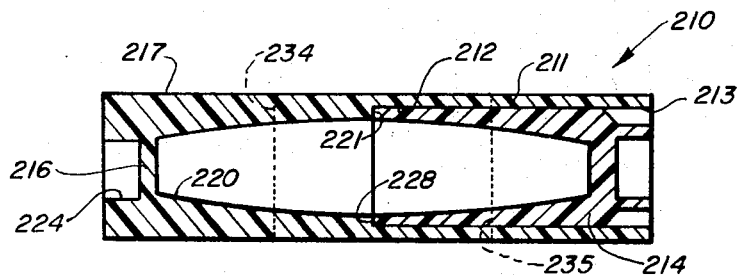
FIG. 5 is a cross-sectional elevational view of a third embodiment of spirit level vial according to the invention.

Referring now to FIG. 5, a third embodiment of spirit level vial according to the principles of the present invention is shown and designated generally by the reference numeral 210. Spirit level vial 210 comprises a generally cylindrical transparent outer body 211 which may be manufactured from the materials discussed above with respect to spirit vial 10. Outer body 211 is provided with a longitudinally axial bore 212 extending through approximately one half its length from an open end 213. Longitudinally axial bore 212 is provided to accommodate the insertion of an insert member 214 therein. Insert member 214 is identical in all respects to insert members 14 and 16 of level vial 10 of FIGS. 1 and 3.

The end of level vial 210 opposite to the open end 213 is a closed end 216. Extending coaxially with cylindrical bore 212 from the proximate longitudinal center of outer body 211 toward closed end 216 is a curved bore 220. The curvature of bore 220 corresponds in all respects to the curvature of the inner bore in insert member 214. The juncture of cylindrical bore 212 with curved bore 220 cooperates to define a radially extending shoulder or inner edge 221 which is in surface to surface engagement with the radially extending inner edge 228 of insert member 214. The closed end 216 of outer body 211 may be provided with a counter bore 224 to accommodate the receipt of mounting means.

Provided on the outer surface 217 of outer body 211 are two reference marking lines 234, 235. As was noted above with respect to prior embodiments, marking lines 234, 235 may be provided in grooves formed in surface 217 or they may be provided in any of the many ways known in the art for providing such reference lines or marking rings.

Figure 6:
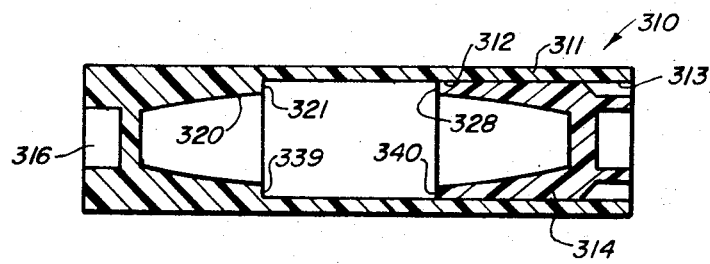
FIG. 6 is a cross-sectional elevational view of a fourth embodiment of spirit level vial according to the invention.

A fourth embodiment of level vial according to the invention is shown in FIG. 6 and designated generally by the reference numeral 310. Vial 310 is substantially identical to the vial 210 of FIG. 5. Thus, vial 310 can be seen to comprise a generally cylindrical transparent outer body 311 having an open end 313 and a closed end 316 extending longitudinally axially from the open end 313 of vial 310 is an axially extending cylindrical bore 312. Bore 312 extends within body 311 over more than half of its length and is in communication with a curved bore 320 extending axially longitudinally within body 311 from adjacent the closed end thereof. Disposed in the open end 313 of body 311 is an insert member 314 which is identical in all respects to insert member 214 with the exception that it is of a length which is shorter than one half of the length of body 311. Thus, the inner edge 328 of insert member 314 is spaced longitudinally from the radially extending shoulder 321 defined by the juncture of cylindrical bore 312 and curved bore 320. As was discussed above in detail with respect to the level vial of FIGS. 2 and 4, a pair of rings 339 and 340 may be provided adjacent the radial extending surfaces 321 and 328 to define markers which are used to indicate the level position in the operation of the level vial.

The manufacture of the level vials in accordance with this invention is simplified greatly over prior manufacturing methods. Considering initially the vials of FIGS. 1-4, each may comprise a plastic tube cut to length to form the outer body 11, 111, and two pieces of plastic machined using ordinary known methods to form insert members 14, 16, 114 and 116. The outside diameter of the insert members is substantially equal to the inside diameter of the outer body. Thus, the device is assembled by inserting insert members in each end of the outer body until their inner edges meet as in the case of vial 10 or until their inner edges are positioned properly within outer body 111 as is the case with vial 110. The vial may either be prefilled or, alternatively, a small hole (not shown) may be provided in the end of one of the insert members and fluid introduced within the now formed vial to a level such as to define an empty volume equal in volume to the desired bubble size. Thereafter, the entire apparatus may be sealed by sealing the opening and also the respective ends between the outer body 11 and 111 and the insert members 14, 16, 114 and 116.

The manufacture of vials in accordance with the structure disclosed in FIGS. 5 and 6 requires the machining of the outer body member and machining of the insert members using known machining methods. Assembly and insertion of the fluid within the vial is accomplished in the same manner as discussed above with respect to the embodiments of FIGS. 1 through 5.

The vials of the present invention are used in the same manner as spirit level vials are used generally in the trade and certainly in the manner suggested in recent patents including those cited above.

It is considered to be manifest that many modifications and variations can be made to the disclosed embodiments of vials in accordance with the invention without departing from the spirit of the invention.

What is claimed is:

1. A spirit level vial comprising:
    a generally cylindrical transparent outer body having a longitudinal axis and a longitudinally extending generally cylindrical outer surface;

a longitudinal bore formed in said outer body and extending through at least a portion of said outer body, said longitudinal bore defining a generally cylindrical inner surface on said outer body;

at least a pair of insert means rigidly received within said longitudinal bore of said outer body, each said insert means including a cylindrical outer surface and a longitudinal bore defining a curved inner surface, said curved inner surface of each insert means cooperating to define a bubble chamber;

said outer surface of each said insert means being substantially equal in diameter to said generally cylindrical inner surface of said outer body;

reference means on said vial for permitting a determination of the position of said longitudinal axis of said spirit level vial with respect to the horizontal; and means for precluding the passage of fluid between said outer surface of said insert means and said inner surface of said outer body.

2. A spirit level vial according to claim 1 wherein:
said insert means includes a first insert member and a second insert member, each said first and second insert members being substantially identical and including a closed end and an open end,
said longitudinal bore of each said insert member extending from said closed end of each said member to said open end of each said member, each said longitudinal bore of each said insert member increasing in transverse diameter from the closed end of each said insert member toward the open end of each said insert member.

3. A spirit level vial according to claim 2 wherein said open end of said first insert member defines a first inner edge and the open end of said second insert member defines a second inner edge and wherein said first and second inner edges are in surface to surface engagement.

4. A spirit level vial according to claim 2 wherein said open end of said first insert member defines a first inner edge and the open end of said second insert member defines a second inner edge and wherein said first and second inner edges are longitudinally spaced apart.

5. A spirit level vial according to claim 4 wherein said reference means includes a reference marking disposed on each said first and second inner edges of said first and second insert members.

6. A spirit level vial according to claim 2 wherein said reference means includes a reference marking disposed on the cylindrical outer surface of said first insert member and a reference marking disposed on the cylindrical outer surface of said second insert member.

7. A spirit level comprising:
a generally cylindrical transparent outer body having a longitudinal axis and a longitudinally extending generally cylindrical outer surface;
a longitudinal bore formed in said outer body and extending through at least a portion of said outer body, said longitudinal bore extending from one end of said outer body for a distance less than the full length of said outer body such as to define a closed end and an open end of said outer body, said longitudinal bore defining a generally cylindrical inner surface on said outer body;
insert means rigidly received within said longitudinal bore of said outer body, said insert means including a cylindrical outer surface and a longitudinal bore defining a curved inner surface;

said outer surface of said insert means being substantially equal in diameter to said generally cylindrical inner surface of said outer body, and said insert means being disposed within said longitudinal bore adjacent said open end of said outer body to close said bore and cooperate with said outer body to define a chamber therein;

reference means on said level for permitting a determination of the position of said longitudinal axis of said spirit level vial with respect to the horizontal; and means for precluding the passage of fluid between said outer surface of said insert means and said inner surface of said outer body.

8. A spirit level vial according claim 7, including a curvilinear bore formed in said outer body, said curvilinear bore being coaxial with said longitudinal bore and extending longitudinally from said longitudinal bore toward said closed end of said outer body, the maximum diameter of said curvilinear bore being less than the diameter of said longitudinal bore and cooperating therewith to define a radially extending shoulder.

9. A spirit level vial according to claim 8, wherein said curved inner surface of said insert means cooperates with said outer surface of said insert means to define a generally radially extending inner edge.

10. A spirit level vial according to claim 9, wherein said shoulder of said outer body and said inner edge of said insert means are in surface to surface engagement.

11. A spirit level vial according to claim 9, wherein said shoulder of said outer body and said inner edge of said insert means are longitudinally spaced apart.

12. A spirit level vial according to claim 11 wherein said reference means includes a reference marking disposed on each of said shoulders of said outer body and said inner edge of said insert means.

13. A spirit level vial according to claim 7 wherein said longitudinal bore in said outer body includes a curved surface extending from said closed end to substantially the longitudinal center of said longitudinal bore.

14. A spirit level vial according to claim 13 wherein said insert means includes a cylindrical outer surface and a curved inner surface and wherein said curved inner surface of said insert member is substantially identical in surface configuration to said curved surface of said longitudinal bore in said outer body.

15. A spirit level vial according to claim 14 wherein:
said curved surface of said bore in said outer body cooperates with said cylindrical surface of said bore to define a radially extending shoulder; and
said insert member includes an inner edge.

16. A spirit level vial according to claim 15 wherein said radially extending shoulder and said inner edge are in surface to surface contact.

17. A spirit level vial according to claim 15 wherein said radially extending shoulder and said inner edge are spaced longitudinally apart.

18. A spirit level vial according to claim 17 wherein said reference means includes a marking disposed on said radially extending shoulder and a marking disposed on said inner edge of said insert member.

19. A spirit level vial comprising:
a generally cylindrical transparent outer body;

a longitudinally extending bore within said outer body, said longitudinally extending bore extending through a portion of the length of said outer body, said outer body thereby being closed at one end and open at one end;

a longitudinally extending curved surface defined by a portion of said longitudinally extending bore, said curved surface extending longitudinally from said closed end of said outer body to substantially the longitudinal center of said outer body;

a longitudinally extending cylindrical surface defined by said longitudinally extending bore, said cylindrical surface extending from the end of said longitudinally extending curved surface adjacent the longitudinal center of said outer body to said open end of said outer body;

insert means rigidly received within said longitudinally extending bore of said outer body, said insert means including a cylindrical outer surface and a curved inner surface, said outer surface of said insert means being substantially equal in diameter to said longitudinally extending cylindrical surface of said outer body as defined by said bore, said curved surface of said insert means being substantially identical in curvature to said longitudinally extending curved surface of said bore of said outer body;

means for precluding the passage of fluid between said outer surface of said insert means and said cylindrical surface of said outer body as defined by said longitudinally extending bore; and reference means on said vial for permitting a determination of the position of the longitudinal axis of the spirit level vial with respect to the horizontal.

* * * * *